July 28, 1953 R. SAULNIER 2,646,949
TWO-PANEL SLIDABLE AND JETTISONABLE
ROOF FOR THE COCKPITS OF AIRCRAFT
Filed Nov. 29, 1949 3 Sheets-Sheet 1

Inventor:-
Raymond Saulnier
by Brown & Seward
Attorneys

July 28, 1953 R. SAULNIER 2,646,949
TWO-PANEL SLIDABLE AND JETTISONABLE
ROOF FOR THE COCKPITS OF AIRCRAFT
Filed Nov. 29, 1949 3 Sheets-Sheet 2
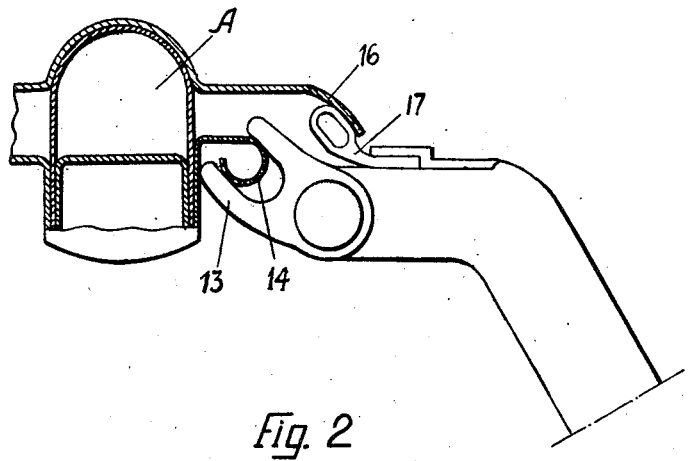
*Fig. 2*
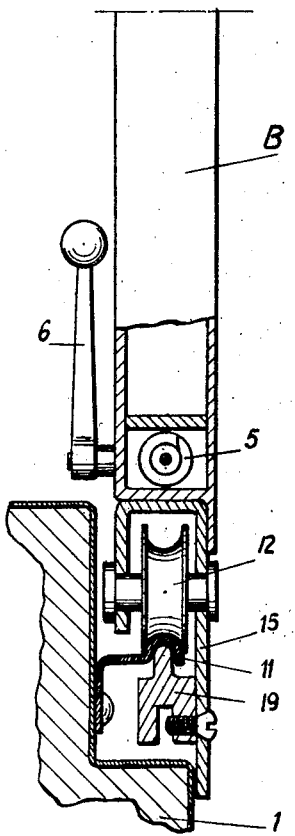
Inventor:-
Raymond Saulnier
by Brown & Seward
Attorneys

July 28, 1953

R. SAULNIER 2,646,949

TWO-PANEL SLIDABLE AND JETTISONABLE
ROOF FOR THE COCKPITS OF AIRCRAFT

Filed Nov. 29, 1949

Inventor:-
Raymond Saulnier
by Brown + Leward
Attorneys

Patented July 28, 1953

2,646,949

UNITED STATES PATENT OFFICE 2,646,949

TWO-PANEL SLIDABLE AND JETTISONABLE ROOF FOR THE COCKPITS OF AIRCRAFT

Raymond Saulnier, Paris, France

Application November 29, 1949, Serial No. 129,899
In France December 20, 1948

6 Claims. (Cl. 244—121)

In the applicant's U. S. Patent No. 2,125,752 for "Removable Roof for the Cockpits of Aircraft," there has been described a cockpit closing system in which the roof was capable, on the one hand, of sliding so as to give freely access to the pilot's cockpit and, on the other hand, of being completely removed in case of emergency so as to open instantaneously said cockpit.

The present invention has for its object a cockpit removable roof of this type but having particular features, so that in certain cases, it is to be preferred.

In the system described in the above mentioned patent, the roof is displaced as a whole and uncovers the inner space of the cockpit from the top. Such an arrangement is very useful in fighters in which the cockpit has a small size in the longitudinal direction of the plane. However, in the two-seaters having one single cockpit and, particularly, in the four-seaters in which the cockpit is used by several persons, said cockpit has necessarily a larger size. This increases the weight and volume of the roof, while making the control of the system very difficult and increasing the risk of having the rudders damaged by the detached roof.

The invention aims at a simple and practical device ensuring the sliding and release of the roof without resulting in the above mentioned drawbacks.

According to the invention, an upper longitudinal element such as a beam, located along the airplane axis and supported at its front end by the wind-screen structure and at its rear end by the hull, is permanently secured on the fuselage and protects the occupants of the cockpit in case of somersault, while the roof is constituted by two slidable jettisonable panels.

Moreover, the weight and volume of the slidable and jettisonable elements are thus reduced, the control of the system is made easier and the risks of having the rudders damaged at the instant when the panels are detached are practically reduced, due to the fact that the panels fall on either side of the airplane tail.

The sliding and release of the panels may be ensured in any desired manner within the scope of the invention which aims generally at any aircraft comprising a mid-longitudinal beam located along the airplane axis above the cockpit and two slidable jettisonable panels located one on either side of said beam.

However, the invention also contemplates a preferred embodiment in which each panel is connected by its lower edge to a carriage capable of sliding on longitudinal rails secured on the fuselage, means being provided to release instantaneously, in case of emergency, said lower edge from said carriage, while the upper edge of each panel comprises at least one fork which is engaged on a rail provided on the above mentioned fixed upper mid-longitudinal beam so that, once the lower edge of a panel is released, it may be completely detached from the airplane by merely pushing upon it.

A preferred embodiment of the invention will be hereinafter described with reference to the accompanying drawings given merely by way of example and in which:

Fig. 2 is a cross-sectional view showing a preferred embodiment;

Figure 1:
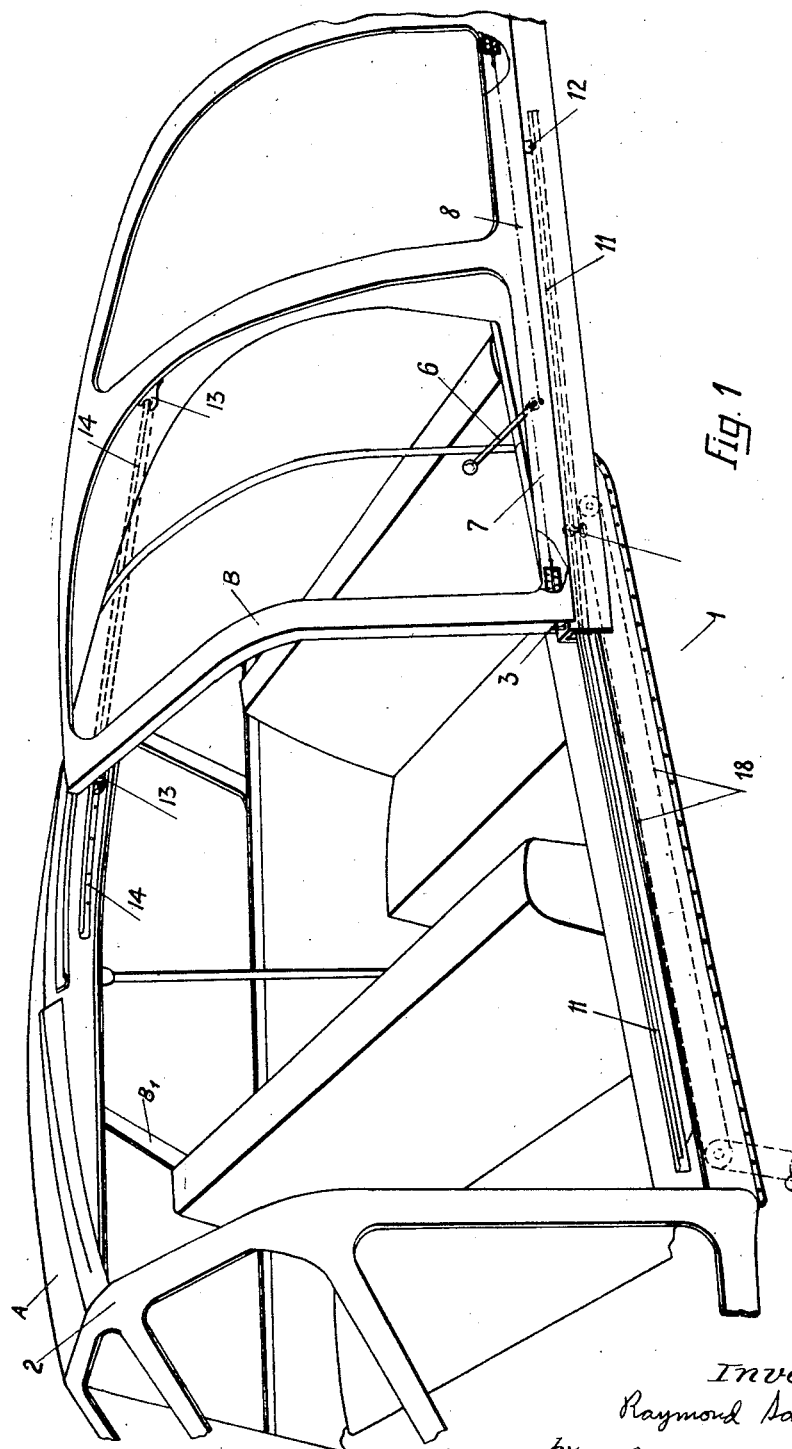
Fig. 1 is a perspective view showing the operation of the device.

Referring to the drawings, there is shown at 1 the fuselage and at A a beam secured at its front end to the stationary wind-screen 2 and at its rear end to the hull of the plane. Said beam is thus located above the head of the occupants of the four-seater cockpit shown as an example and protects them in case of somersault. The above mentioned cockpit may be completely closed by two similar panels B and B₁ located one on either side of beam A. These panels are so designed that they may slide (see panel B of Fig. 1) to give normally access to the inner space of the cockpit and that, moreover, they may be instantaneously released, so as to open immediately the cockpit, in case of emergency.

This combination constitutes the object of the invention and this, independently of the means used to obtain this result.

Figure 3:
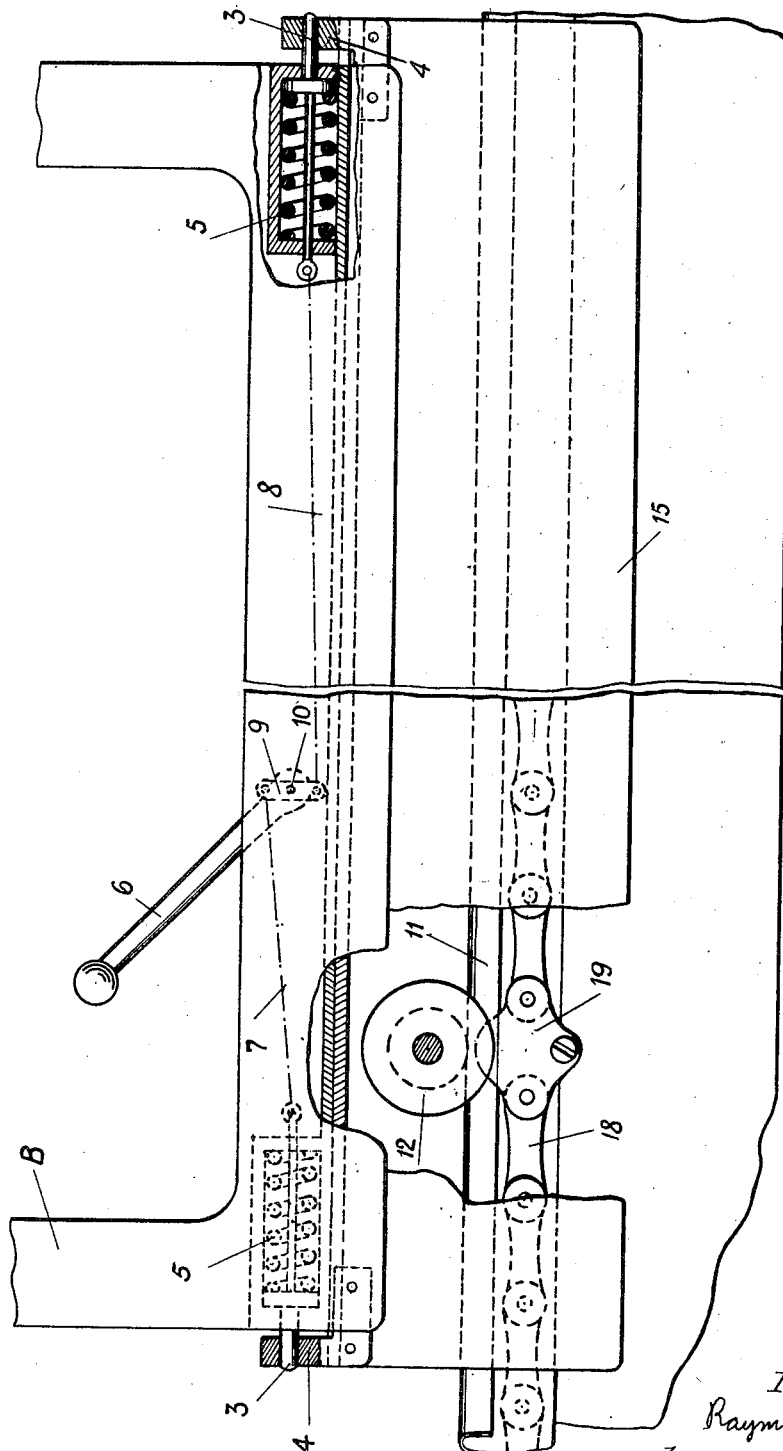
Fig. 3 is a lateral view of said embodiment with a partial section.

In the example shown, the lower edge of each panel is connected at both ends with a sliding element 3 capable of engaging with an eye 4 provided on the corresponding carriage 15. The two sliding members 3 are urged by resilient means such as springs 5 into the locking direction while positive control means, such as a lever 6, permit to release simultaneously both lockings by a simple displacement. In the example of Fig. 3, this system is diagrammatically materialized by two cables 7 and 8 which are anchored, on the one hand, each to one of the locking means and, on the other hand, to the end of a small lever 9 which may be pivoted by means of lever 6 about axis 10. It will be understood that this is a mere diagrammatic embodiment and that any other control system may be provided within the scope of the invention as defined by the appended claims.

Carriages 15 slide, as shown in particular in Fig. 2, on rails 11 provided on either side of the fuselage, by means of rollers 12, which permits to control the sliding of the carriage and, therefore, of the panels, by means of any suitable control system.

The upper edge of each panel carries at least one fork 13 (two in the example shown) which is engaged on a rail 14 provided on the mid-longitudinal beam A. Thus, as soon as the locking means 3 are released, it is only necessary to push slightly outwards on the lower part of the panel, to release it instantaneously, and this towards the side of the plane so that when said panel is carried away by the wind, it cannot come into contact with the rudders. In the example shown, beam A carries metal sheets which, in combination with resilient compressible weather strips 17 of rubber or other suitable material, protect the inner space of the cockpit against rain, etc.

The displacement of the carriage along the rails may be controlled in any desired manner, e. g. by means of chains 18 which, in the example shown, are anchored on members 19 located under rails 11 and which are adapted to prevent the carriage from running off the rails. However, it will be understood that any other arrangement may be provided within the scope of the invention which is in no way limited to any specific embodiment of the carriage and which aims generally at any jettisonable cockpit roof constituted by two separate panels capable, on the one hand, of sliding and, on the other hand, of being instantaneously detached from the aircraft in combination with an upper stationary mid-longitudinal beam.

The invention also aims at a device of the type described which is detached from the aircraft by releasing the panel from the carriage and this by means of a positive control, while the upper edge of each panel is so engaged with the mid-longitudinal beam that it may be instantaneously released as soon as the lower edge thereof is released with respect to the carriage.

What is claimed is:

1. In combination with an aircraft having a space for pilot or passengers, two separate closing elements for said space disposed one on either side of the longitudinal axis thereof, normally slidable with respect to said space in a fore and aft direction and capable of being operated when in flight, a longitudinal element supporting said closing elements and extending over said space along the whole length thereof, in the vertical plane of said longitudinal axis, said closing elements being jettisonable instantaneously from said aircraft, and means operative from inside of said space to release said closing elements on said aircraft.

2. In combination with an aircraft having a space for pilot or passengers, two separate closing elements for said space disposed one on either side of the longitudinal axis thereof, a longitudinal element supporting said closing elements and extending over said space along the whole length thereof, in the vertical plane of said longitudinal axis, a support for each of said closing elements slidable with respect to said space in a fore and aft direction, means operative from the inside of said space for controlling the movements of said support with respect to said space, means for detachably securing said support and said closing element together, and means operative from the inside of said space for instantaneously releasing said securing means.

3. In combination with an aircraft having a space for pilot or passengers, two separate closing panels for said space disposed one on either side of the longitudinal axis thereof, a longitudinal beam supporting said closing panels and extending over said space along the whole length thereof in the vertical plane of said longitudinal axis, each panel being connected on its lower edge to a carriage capable of sliding along the side of the fuselage in a fore and aft direction, means to release instantaneously said panel with respect to said carriage, and means to engage the upper edge of said panel with said longitudinal beam so that the release of its lower edge makes it immediately jettisonable, no additional operation being necessary to release its upper edge.

4. In combination with an aircraft having a space for pilot or passengers, two separate closing panels for said space, disposed one on either side of the longitudinal axis thereof, a longitudinal beam supporting said closing panels and extending over said space along the whole length thereof in the vertical plane of said longitudinal axis, each panel being connected on its lower edge to a carriage capable of sliding along the side of the fuselage in a fore and aft direction, means to release instantaneously said panel with respect to said carriage, said longitudinal beam being provided with two longitudinal rails on either side thereof and said panels being provided on their upper edge with at least one fork adapted to be engaged on one of said rails so that said panels may slide with said fork along said rails, the release of the lower edge of said panels making it immediately jettisonable by a mere transverse displacement.

5. In combination with an aircraft having a space for pilot or passengers, two separate closing panels for said space disposed one on either side of the lonigtudinal axis thereof, a longitudinal beam supporting said closing panels and extending over said space along the whole length thereof in the vertical plane of said longitudinal axis, each panel being connected on its lower edge to a carriage capable of sliding along the side of the fuselage in a fore and aft direction, the lower edge of said panels being connected to said carriage by means of two sliding members acting as locking means and provided one at the front end and the other one at the rear end of said panels, said locking means being engaged in the closing position into eyes provided on the corresponding carriage, resilient means to urge said locking means towards their locking position, positive control means to bring said locking means instantaneously into their panel-releasing position, and means to engage the upper edge of said panel with said upper longitudinal beam so that the release of its lower edge makes it immediately jettisonable, no additional operation being necessary to release its upper edge.

6. In combination with an aircraft having a cockpit, a roof comprising a fixed central portion extending in a fore and aft direction above said cockpit and two movable lateral portions normally positioned on either side of said fixed portion, a support for each of said lateral portions slidable with respect to said cockpit, means for detachably securing said lateral portions to said supports, control means for releasing said securing means whereby said lateral portions are detached from said supports, and interengaging formations on said fixed and movable roof portions adapted to normally hold the same together while permitting sliding movement of said movable roof portions and to disengage upon release of said securing means.

RAYMOND SAULNIER.

References Cited in the file of this patent

UNITED STATES PATENTS

| Number | Name | Date |
|---|---|---|
| 2,196,546 | Bowers | Apr. 9, 1940 |
| 2,367,075 | Ulmer | Jan. 9, 1945 |
| 2,375,925 | Johnson et al. | May 15, 1945 |
| 2,403,250 | Verhagen | July 2, 1946 |
| 2,424,245 | Martin | July 22, 1947 |
| 2,556,062 | Buehrig | June 5, 1951 |